Aug. 8, 1944.    T. A. ERICKSON    2,355,211
CONTACT OPENING INDICATOR FOR IGNITION GENERATORS
Filed Jan. 23, 1943
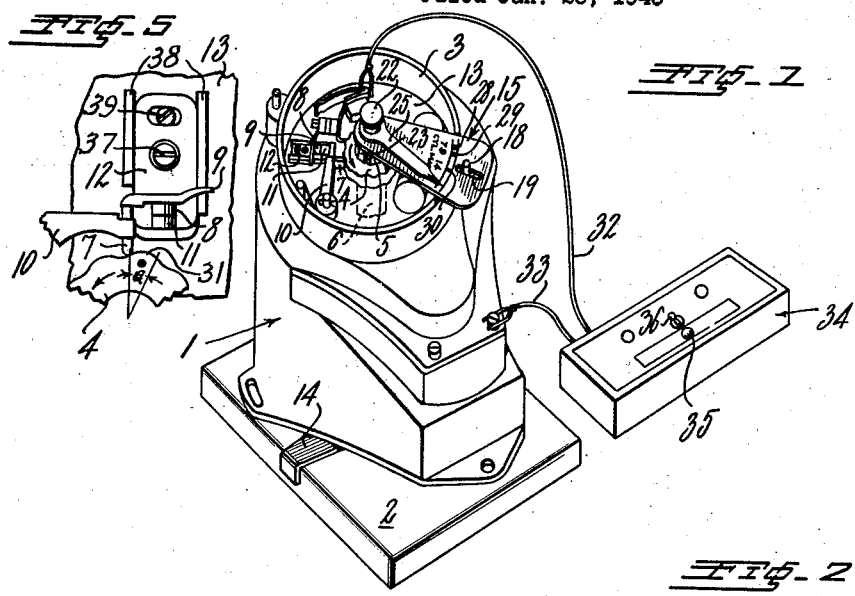
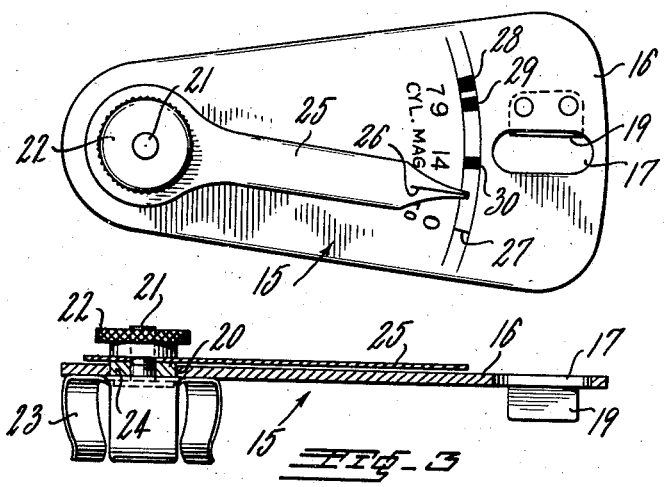
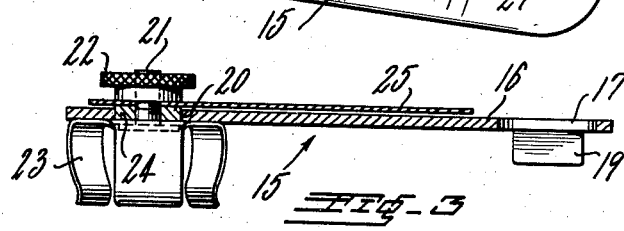
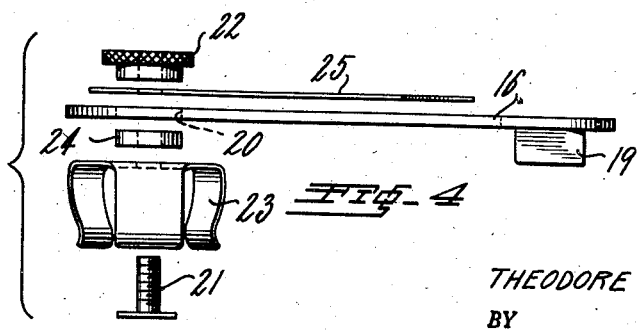
INVENTOR.
THEODORE A. ERICKSON
BY
ATTORNEY Patented Aug. 8, 1944

2,355,211

UNITED STATES PATENT OFFICE 2,355,211

CONTACT OPENING INDICATOR FOR IGNITION GENERATORS

Theodore A. Erickson, Springfield, Mass., assignor to American Bosch Corporation, Springfield, Mass., a corporation of New York Application January 23, 1943, Serial No. 473,401

3 Claims. (Cl. 116—124)

The present invention relates to contact opening indicators of the unitary type for testing in service in the field, and preferably also for correcting, the angular period of rotation of the breaker mechanism during which the circuit contacts are held open by the cam of each of a plurality of types of ignition generators, as those adapted for engines of different numbers of cylinders, or otherwise as hereinafter noted. The ignition generator may be in the form of a magneto or a battery-supplied timer distributor, and the indicator is used when the generator is inoperative whether installed on an engine or removed therefrom.

Heretofore it has been customary to assume that the maximum gap between the circuit contacts gives a reliable measure of the angular period during which the contacts are open, since the contour of the cam and other features of the breaker as originally manufactured are designed with a substantially fixed maximum gap for a predetermined angular period of opening; and also that this maximum gap can be determined sufficiently reliably with a set of feeler gauges. While feeler gauges do give fairly reliable results when the contacts are new, the surfaces of the contacts after use are apt to be rough and uneven due to wear, pitting and corrosion, so that the accuracy of such determination depends not only upon the operator's sense of touch but also upon the surface condition of the contacts.

In accordance with my invention, the indicator is a unitary structure comprising scale and pointer members pivotally connected and mutually supported so as to form a structural unit attachable to and removable from the generator as such, and in the preferred form for testing breaker mechanisms having a rotatable cam and normally stationary circuit contacts cooperative therewith, the scale member is adapted to be detachably fastened in fixed position to the ignition generator, as the breaker housing thereof; and the pointer member. The scale has several other indices so that the same scale may be used in an indicator for testing different generators for different numbers of engine cylinders, or for testing generators having cams providing different angular extents of contact openings, or otherwise. If desired, the indicator may have its pointer fixed and its scale rotatable with the cam, and either form of indicator may also be used for testing breaker mechanisms having fixed cams and rotatable circuit contacts. Also if desired a lamp or buzzer or meter or other signal device may be used in conjunction with the contact opening indicator by electrically connecting it across the circuit contacts to indicate when they open and close.

The primary object of the invention is to provide contact opening indicators of the aforesaid kinds which are simple and durable in construction, quickly applied to various types of ignition generators, whether installed on the engine or removed therefrom, and sufficiently accurate in their indication for all practical purposes for which they are used for circuit contacts in normally used condition.

Another object is to provide such indicators which are adapted for testing different ignition generators for different numbers of engine cylinders or otherwise, and also which may be readily changed for still other types of ignition generators for the same or different numbers of engine cylinders but designed for different periods of contact opening.

Other objects and advantages of the invention will be understood from the following description of the preferred form of contact opening indicator adapted to have, as an example, a movable pointer and a fixed scale indexed for 7, 9 and 14-cylinder magnetos and designed for a maximum contact opening in each case of from 0.008 to 0.010 inch in breaker mechanism having a rotatable cam. In the accompanying drawing illustrating this form of the invention, Fig. 1 shows in perspective view a 14-cylinder magneto demounted from the engine with its breaker cover removed, and having the contact opening indicator installed for test in conjunction with a signal lamp; Fig. 2 shows, on an enlarged scale, a face view of the unitary contact opening indicator; Fig. 3 is a side view thereof, partly in section; Fig. 4 is a side view of the indicator parts disassembled; and Fig. 5 illustrates the position of parts of the breaker mechanism when the circuit contacts start to open.

Referring to Fig. 1, the reference numeral 1 indicates a 14-cylinder magneto of well known kind demounted from the internal combustion engine with which it is intended to be associated, and standing on a mounting board or bench 2 with the breaker cover removed to expose the breaker assembly in the breaker housing 3. As generally shown in Patent No. 2,240,804, this breaker assembly comprises, among other things, a 14-lobe cam 4 which is fastened in position by means of nut 5 on the rotary shaft 6 and which cooperates with the cam follower 7 controlling the circuit contacts. Of these, the live contact 8 is carried by a spring lever 9 which is periodically deflected by the pivoted lever 10 carrying the cam follower 7, while the grounded contact 11 is carried by a conducting bracket 12 which is adjustably fastened to the grounded breaker plate 13 so as to permit the contact 11 to be moved toward or away from the contact 8 and thereby adjust the maximum opening between them as hereinafter described. The shaft 6 is geared in the well known way to an engine driven shaft (not shown) having fastened on its outer end a driving coupling which is adapted to be held against turning by the tool 14 having its bent over end resting squarely against the edge of the board or bench 2 as shown.

The contact opening indicator shown in Figs. 2-4 and generally indicated by the reference number 15, is attachable to and removable from the magneto as a unit. It comprises a flat scale member or plate 16 with an elongated opening at 17 through which extends a stud 18 projecting from the breaker housing 3 of the magneto as shown in Fig. 1, or a screw temporarily projecting from the housing and fastening the plate to it. The bent spring plate 19 is riveted to the rear face of the plate adjacent the opening 17 to resiliently hold the plate in fixed position on the projecting member 18 of the housing. The plate also has near its opposite end an opening at 20 through which passes a pivot 21 having a screw threaded stem adapted to take the finger nut 22 and also having a head adapted to secure the triangular-shaped nut grip 23 of spring metal. This nut grip is adapted to tightly and detachably embrace opposite faces of the hexagonal nut 5 securing the cam 4 on its shaft 6. The spacing washer 24 lies against the back face of the nut grip 23 and extends through the opening at 20 to a plane just above the upper face of the scale plate 16, so that the pointer member 25 is slightly spaced from the plate in swinging over it on its pivot 21 when the parts are fastened together in assembled position as shown best in Fig. 3. In this tightly assembled position, the pointer member 25 turns freely over the scale plate, and the nut grip 23 turns freely underneath the scale plate, the pointer member and the nut grip being pivoted as a unit on the scale plate to turn relatively thereto. However, upon loosening the thumb screw 22, the pointer member may be turned freely while the scale plate and the nut grip remain fixed in position.

The pointer member 25 has an indicating line at 26. The scale plate 16 has a zero index at 27 and three tolerance area indices, angularly separated therefrom and from each other, at 28, 29 and 30 for 7, 9 and 14-cylinder magnetos, respectively. That edge of each area nearer the zero index represents the angular separation therebetween corresponding to the maximum contact opening of 0.008 inch, and the other edge of each area represents the angular separation therebetween corresponding to the maximum contact opening of 0.010 inch. In each case the angular separation equals the angular period of opening of the circuit contacts of the magnetos when new, with a maximum opening or lift of 0.008 or 0.010 inch, as the case may be, of the circuit contact 8 from contact 11.

The preferred method of testing the contact point opening of the magneto with this indicator 15 will now be described with particular reference to Figs. 1, 2 and 5. First, the contact indicator 15 is attached as a unit to the magneto, as shown in Fig. 1, with the spring nut grip 23 snugly embracing the nut 5 to turn therewith without backlash, and with the spring 19 snugly holding the stud 18 in opening 17 of the scale member without looseness. In order to avoid variations in contour, spacing, etc., the cam lobe 31 is marked with a dot (.) to distinguish it as the one at which the test should always be made. Then with the drive shaft held against turning by means of the tool 14, the magneto 1, with the breaker plate 13 fixed therein, is turned on the mounting board or bench 2 until the cam follower 7 attains the position shown in Fig. 5, at which the lobe 31 just starts to lift the circuit contact 8 from the circuit contact 11. The leads 32 and 33, connected to the signal device 34 containing the lamp 35 and switch 36, having previously been connected to a live terminal of the breaker mechanism and to a grounded element of the magneto as shown in Fig. 1, and the switch having been closed, the lamp, which was off while the circuit contacts were closed and thereby short circuited the lamp, becomes lighted by the battery in the signal device 34 at the instant the contacts start to open and thus signals this position. At this position, or before if desired, the thumb nut 22 is loosened to release the pointer member 25 from the nut grip 23, or the pointer member is forced against the pressure of the nut and is turned on the pivot until its index line 26 coincides with the zero index 27 on the scale member, whereupon the thumb nut, if loosened, is retightened until the pointer member is again securely fastened to the nut grip so as to turn therewith. Since the shaft 6 and the cam 4 turn bodily around the gear on the engine driven shaft of the magneto, upon turning the magneto in a counter-clockwise direction until the circuit contacts just close, as determined by the instant at which the lamp 35 is again out, the scale member will be turned, also in a counter-clockwise direction, and the pointer member turning more or faster will show on the scale member the angular movement of the cam of the breaker mechanism covered by the open period of the circuit contacts, which normally is that angle a included between the lines in Fig. 5 enclosing the lobe 31. If now, the index 26 lies in the tolerance area index 30, the angular period of opening of the contacts may be assumed to be correct. But if the index 26 is off the index 30 to one side or the other, correction is required on account of the worn, pitted, eroded or corroded condition of the contacts or the erroneous setting thereof. This is accomplished by adjusting the position of the contact 11 to alter the maximum gap between it and the cooperative contact 8. To make this adjustment, the holding screw 37 is loosened to free the bracket 12 for movement between its guides 38. Then the eccentric headed screw 39 is turned in the proper direction to move the bracket 12, and with it the contact 11, toward the cam 4 to increase the maximum gap and the angular period of opening of the contacts if the index 26 has not reached the index 30, and away from the cam to decrease the maximum gap and the angular period of opening if the index 26 has moved past the index 30. However, before this contact adjustment is made, the pointer member is pushed, whether or not loosened on its pivot, for the distance half way from the incorrect position to its desired position in the tolerance area index 30, and then is moved with the cam for the remaining half of the distance by turning the magneto in the proper direction. The holding screw 37 is then retightened. Preferably the adjustment is checked to make certain that it is proper. If not, it is again corrected as aforesaid. It will be understood that the pointer member alone need be turned for only that half distance, since the remainder of the correction then occurs equally at the opening slope of the cam lobe.

If the magneto under test is for 7 or 9 cylinders, instead of 14 cylinders, the area 28 or 29, respectively, is the proper one to use as the area 30 was used in the foregoing test. There being fewer lobes and greater angles between lobes in these magnetos for the lesser number of engine cylinders, and the angular period of contact opening being greater in each case, these areas 28 and 29 are separated from the zero index 27 by greater angles, and the angular widths of the tolerance areas are greater. For less cylinders than 7, or greater than 14, other tolerance areas indices will be located appropriately on the scale, and the scale may have as many of the areas as desired. If the magneto is of a different type or design such that a greater or less part of the angle between lobes is apportioned to the open angular period of the breaker, the areas will be located on the scale member at different angles from the zero index thereon.

Also the aforesaid test may be made with the magneto installed on the engine instead of on the base board 2. In this case, the operation is similar except that, after the breaker cover is removed and the contact opening indicator installed, the cam 4 is turned by the flywheel or propeller or other rotatable element of the engine while the magneto remains fastened to the engine.

If desired, other scale plates may be provided to replace when desired the one 16 of the indicator 15. Each of these others may be indexed for magnetos other than for 7, 9 and 14 cylinders and/or for magnetos designed for angular opening periods of greater or less proportion of the period between lobes than is herein provided. Thus the indicator may have increased scope in use in service in the field merely by providing separate replacement scales appropriately indexed.

Although the preferred embodiment only of the unitary contact opening indicator is disclosed herein, it will be understood that many changes and modifications may be made therein without departing from the spirit of the invention in application to any form of ignition generator adapted for engines having any suitable number of engine cylinders operating on any cycle. For instance, the scale and pointer members may be reversed so that the scale member is detachably fastened to a rotatable element of the generator and the pointer member to the projecting member of the generator. Also the rotatable member of the indicator may be of any other suitable construction, and may be detachably connected to any suitable rotating element of the generator other than the cam nut so long as the rotation of that element is proportional to that of the cam. Also the fixed member of the indicator may be detachably fastened to any other suitable projection member of the generator in any suitable way. Also any suitable number of indices, constituted by lines or tolerance areas, may be arranged on the scale for use with other combinations of generators, each of any type or design having for its angular period of contact opening any proportional part of the angular spacing of the cam lobes. Also the breaker mechanism may have its interrupter contacts rotatable and its cam fixed instead of the reverse as herein specifically shown. Also any other suitable method of determining the angular extent of the contact opening may be used with the indicator of the general kind herein disclosed, or as modified as aforesaid, including any other suitable kind of signal device if such is used at all. These and other modifications are intended to be included within the broad terms of the appended claims.

Having thus described my invention, what I claim is:

1. In a unitary contact-opening indicator for a plurality of ignition generators of different types having breaker mechanisms with relatively rotatable cams and circuit contacts cooperative therewith; a scale member having a zero index and a plurality of other indices angularly offset therefrom and from each other to represent appropriate angular periods of opening of the circuit contacts of the respective generators; and a pointer member which is pivoted to and supported by the scale member to form therewith a structural unit attachable to and removable as such from the generators, and which is cooperative with the zero index and with that one of the other indices for the generator under test; one of said members being constructed and arranged to be detachably fastened to a fixed part of the generators and the other of said members being constructed and arranged to be detachably fastened to a rotatable element of the generators for angular movements therewith to indicate between them while the generator under test is inoperative the extent of the angular movement of the breaker mechanism thereof covered by the open period of its circuit contacts.

2. In a unitary contact-opening indicator for a plurality of ignition generators of different types having breaker mechanisms with relatively rotatable cams and circuit breaker contacts cooperative therewith; a scale which has a zero index and a plurality of other indices angularly offset therefrom and from each other to represent appropriate angular periods of opening of the circuit contacts of the respective generators, and which is constructed and arranged to be detachably fastened to a fixed part of the generators; and a pointer which is constructed and arranged to be detachably fastened to a rotatable element of the generators for angular movements therewith and is pivoted to and supported by the scale to form therewith a structural unit attachable to and removable as such from the generators, and which cooperates with the zero index and with that one of the other indices for the generator under test by indicating on the scale while the generator is inoperative the extent of the angular movement of the breaker mechanism covered by the open period of its circuit contacts.

3. In a unitary contact-opening indicator for a plurality of ignition generators of different types having breaker mechanisms with relatively rotatable cams and circuit breaker contacts cooperative therewith; a scale which has a zero index and a plurality of other indices angularly offset therefrom and from each other to represent appropriate angular periods of opening of the circuit contacts of the respective generators, and which is constructed and arranged to be detachably fastened to a fixed part of the generators; a pivot constructed and arranged to be detachably fastened to a rotatable element of the generators for angular movements therewith; and a pointer releasably engaged with the pivot and cooperative with the zero index and that one of the other indices for the generator under test by indicating on the scale while the generator is inoperative the extent of the angular movement of the breaker mechanism covered by the open period of its circuit contacts; the scale, pivot and pointer forming a structural unit attachable to and removable as such from the generator.

THEODORE A. ERICKSON.